(12) United States Patent
Cole et al.

(10) Patent No.: US 10,949,624 B2
(45) Date of Patent: Mar. 16, 2021

(54) SYSTEM AND METHOD FOR DEFINING AND PRESENTING A NARRATIVE

(71) Applicants: Taylor Cole, Riverside, CA (US); Catherine Altmann, Seattle, WA (US); James Altmann, Seattle, WA (US); Cory Campbell, Lake Elsinore, CA (US); Daniel Corrigan, Valley Village, CA (US); Phillip Powers, Laguna Niguel, CA (US); Edmar Ramos, Perris, CA (US); Austin Quan, Burbank, CA (US); Stephanie Wilson, DuPont, WA (US)

(72) Inventors: Taylor Cole, Riverside, CA (US); Catherine Altmann, Seattle, WA (US); James Altmann, Seattle, WA (US); Cory Campbell, Lake Elsinore, CA (US); Daniel Corrigan, Valley Village, CA (US); Phillip Powers, Laguna Niguel, CA (US); Edmar Ramos, Perris, CA (US); Austin Quan, Burbank, CA (US); Stephanie Wilson, DuPont, WA (US)

(*) Notice: Subject to any disclaimer, the term of this patent is extended or adjusted under 35 U.S.C. 154(b) by 128 days.

(21) Appl. No.: 16/240,524

(22) Filed: Jan. 4, 2019

(65) Prior Publication Data
US 2020/0218783 A1 Jul. 9, 2020

(51) Int. Cl.
*G06F 40/56* (2020.01)
*H04N 21/81* (2011.01)
*H04N 21/8545* (2011.01)

(52) U.S. Cl.
CPC ......... *G06F 40/56* (2020.01); *H04N 21/8106* (2013.01); *H04N 21/8133* (2013.01); *H04N 21/8545* (2013.01)

(58) Field of Classification Search
CPC  G06F 40/56; H04N 21/8106; H04N 21/8545; H04N 21/8133
See application file for complete search history.

(56) References Cited

U.S. PATENT DOCUMENTS

| | | | |
|---|---|---|---|
| 10,135,950 B2* | 11/2018 | Rothera | H04L 67/10 |
| 2013/0309640 A1* | 11/2013 | Sanders | G09B 5/08 |
| | | | 434/178 |
| 2014/0080109 A1* | 3/2014 | Haseltine | A63F 13/12 |
| | | | 434/308 |
| 2016/0225187 A1* | 8/2016 | Knipp | G06T 19/006 |
| 2019/0114300 A1* | 4/2019 | Miltsakaki | G06F 40/216 |

* cited by examiner

*Primary Examiner* — Stella L. Woo
(74) *Attorney, Agent, or Firm* — Nelson Patent Law

(57) ABSTRACT

This document describes a method for preparing narrative content, particularly for presentation as a multi-sensory experience including audio and visual effects and the like. The method involves stripping details from the narrative content and replacing some of them with sensory effects so as to avoid providing too much detail. The method should enable content designers to better adapt content to be expressed on modern storytelling devices. A system is described to assist with the transformation and suggested output devices are also presented.

13 Claims, 5 Drawing Sheets

SYSTEM AND METHOD FOR DEFINING AND PRESENTING A NARRATIVE

FIELD OF THE INVENTION

The present invention relates to learning environments. More specifically, the present invention relates to a method and system for creating and presenting narrative content in a way that promotes engagement and creative thought.

BACKGROUND AND RELATED ART

Storytelling has been an important part of many different societies for thousands of years. Whether oral or written, real or imagined, stories have the ability to engage the emotions, encourage learning, and stimulate creativity. In this culture, written stories have been especially important, with parents reading to their children and libraries regularly hosting "storytime" for young children. Beyond childhood recreation, storytelling remains important into maturity as stories and narratives provide important ways to communicate concepts and otherwise process emotions/events.

At least over the last generation, widespread adoption of televisions, computers, video games, mobile phones and tablets have led to a transformation of how children, in particular, may spend significant portions of their developing years. Rather than spending time outdoors and reading (or being read to), today's children may be more likely to spend hours at a time passively watching screens. Schools have adopted laptops and tablets with hopes of conveniently managing dynamic content. At home, parents have discovered the devices could hold the attention of their small children far longer than many alternatives. And so screen use has increased.

The trend has led many observers to sound the alarm, suggesting the current relationship between children and screen technology is not an altogether healthy one. Too much passive screen time has been associated with a number of potential harms including a reduction in sleep quality and a reduction in the ability to concentrate for extended periods of time. And, while quality video programming may be available, there remain concerns that watching videos can too easily become a passive activity, failing to activate the viewer imaginations. The blue light displayed by device the screens has also been suspected of contributing to eyestrain and macular degeneration, though it is not yet clear to what degree such concern is warranted. As part of the backlash against screen time, many parents and educators have turned their attention back to books (as opposed to video) as a way to teach while encouraging literacy and creativity.

It is likely that aids to storytelling also have been used for almost as long as people have been telling stories. Before the use of text, pictures and then symbols graphically represented events and concepts to be communicated or recorded. In modern history, digital tools have become popular in this regard as well, especially for parents who want to read stories to their children. In the 1980's, multimedia CD-ROMs became an important way of supplementing textual information with sounds, pictures and video.

Today, devices such as the Google Home smart speaker include a "read-along" mode. Once activated, this special mode of operation provides relevant music and sound effects to accompany supported stories when the stories are read out loud. The product uses advanced speech recognition technology to follow the progression of the spoken story. By adding music and sound to the words of an existing story, the smart speaker could be said to increase the engagement of a listener.

Another presently available product, geared toward children, Moonlite Story Book, increases the level of stimuli associated with storytelling by projecting pictures onto nearby surfaces, such as walls and ceilings which creates a limited sense of being in the world of the story.

Campfire has developed a technology to play sound effects and activate smart colored light bulbs to display colors at varying brightnesses. In this way, campfire uses ambient lighting and sound effects to create a more immersive environment for enjoying stories.

In 2013, an academic paper published by the Massachusetts Institute of Technology discussed the "narratarium," a technology that could automatically augment English text or voice input with colors and sounds using machine learning techniques to determine context in real time. U.S. patent application Ser. No. 14/942,815 filed in November, 2015, discloses an immersive dynamic functionality (also a narratarium) allowing story elements to be modified during presentation and providing additional effects to support the story.

U.S. patent application Ser. No. 14/592,080 filed in January, 2015, discloses a storytelling device that establishes an electronic connection to an interactive book and provides story enhancement effects correlating to the book.

And the list continues. Each of these solutions adds detail to the reading experience, arguably providing more content and holding the attention of the listener. However, as the audio and video technologies employed become increasingly sophisticated (providing more and more audio and visual details), it is not at all clear whether the level of engagement in the narrative also increases. At the extremes, purely additive attempts to increase engagement in text may be reduced to largely passive experiences—much like a high definition movie with narration. In other words, progressively adding audio/video content ultimately turns the text experience into "screen time." But several drawbacks to screen time have already been noted above. Of specific concern is the potential reduction in creative or imaginative thinking (even if the harm relates simply to missed opportunities to be creative).

There remains a need for narrative learning environments that encourage creativity and deepen engagement.

SUMMARY OF THE INVENTION

The present invention introduces a method and system for defining and presenting narrative content. Rather than attempting to make the content more engaging by simply adding more sensory activation, the present invention introduces a method for adapting new and existing text into targeted multi-sensory experiences. The method involves stripping the narrative down to a more essential form by removing words or unnecessarily detailed sensory cues and building the narrative up by providing a variety of more minimal audio, visual and other cues that may be linked creatively in the mind(s) of an audience. A narrative definition may be written to a data file for storage, distribution and later use (playback). The present invention further provides a system for presenting these experiences to an audience.

DESCRIPTION OF PREFERRED EMBODIMENTS

Figure 1:
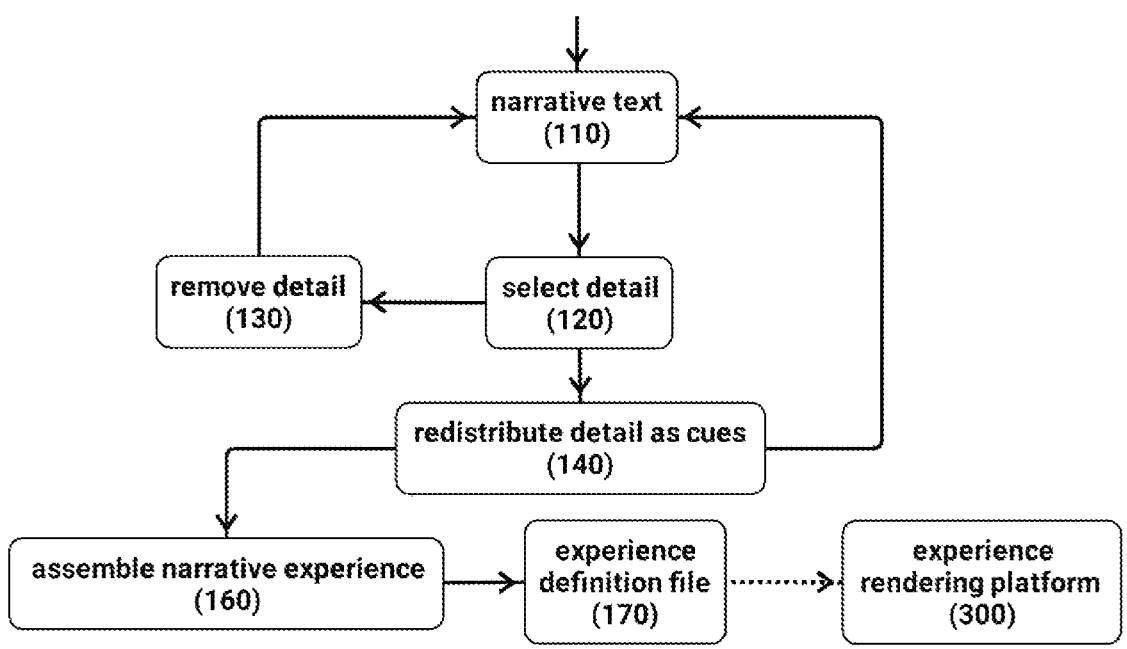
FIG. 1 shows the process of converting a story into a narrative experience.

Research suggests that the viewer effort involved in assembling a narrative increases the permanence of the narrative in the mind of the viewer. Yet, the modern trend has been to provide more and more detail, leaving the viewer with very little to do beyond passively experiencing that which has been prepared. In this way, systems designed with the goal of making content more engaging may actually make it less engaging, by providing very little in the way of "work" to be performed by the mind(s) of the audience. In contrast, techniques such as "active recall" (answering questions rather than merely reviewing material) have value for efficiently consolidating long-term memories.

One objective of the present invention is to present narratives in a way that engages the audience more, increasing the likelihood that aspects of the narrative are consolidated into the memories of the audience. The invention achieves this result by requiring the audience to synthesize the narrative in their own minds. This is achieved by distributing details over multiple sensory channels (such as audio and video) and omitting some details altogether.

It is clear that immersive experiences involving two or more senses may be effective at holding the attention of an audience. However, existing narratives typically already have a desired level of detail providing too much information (by adding sounds and visuals on top of the existing narrative) can lead to a comparatively passive experience. For this reason, among others, the present invention enables a narrative experience designer (designer) to distribute details from a narrative over a number of sensory channels without necessarily increasing the absolute number of details. In this way, the audience can receive the engagement benefit of using several senses to receive the narrative while receiving the right amount of information to actively engage the narrative.

Further, by omitting details from the narrative, a designer can eliminate redundancies between sensory channels. Simultaneously, the omissions can keep the narrative content from becoming overly specific. Overly specific content can be an obstacle to creating personalized narrative experiences. For example, a therapeutic narrative designed to reduce anxiety might look and feel different for each person involved, because each person would have a different idea of what environments reduce anxiety. Narratives that provide the general "feel" of a soothing place without specifically naming it could be especially useful. As many people find the idea of being surrounded by nature soothing, using sensory effects to generally evoke the feel of being in nature, without specifying a particular place, would allow the user to fill in whatever natural setting they find most relaxing; one person might think of a forest while another might think of a mountain meadow, and neither would be "wrong." Because creativity can be discouraged by the use of overly specific descriptions, modifying a story to remove these elements may very well promote creative thinking as the audience supplies its own details.

When reading to children, asking open-ended questions about a story can help the children engage with the story and encourage their creativity. Another useful way to enable creativity is to use more open-ended language, as in the instant art. To achieve this effect, a story to be told must first be converted into a narrative experience containing just the right level of detail. In a preferred embodiment, very specific descriptive words and terms are replaced with more generic terms that nevertheless still make sense in terms of the original story. Certain descriptive actions may also be removed from the story, and replaced with sounds and/or lighting effects within the enclosed area that would suggest that the original action was being performed. However, no description of the original action need be provided. Instead, the audio and/or lighting effects would convey the emotional tone of what had happened and how it might affect the characters in the story. FIG. 1 shows an overview of the modification process.

Process and Platform Overview

There are several processes and platform components that make up a typical implementation of the present invention. First, there are processes and process-enabling tools for transforming a narrative into a narrative experience that can be distributed and replayed. There are also processes and process enabling tools for receiving the narrative experience in the form of a script or set of conditional instructions and orchestrating the experience for an audience.

In this document the term "narrative experience" refers to the experience that has been designed by following methods described herein. Unlike the generic experience of reading or listening to a text-only narrative, the narrative experiences discussed herein will typically involve two sensory channels (audio or video, for example), in addition to text. The narrative experience may be described (in files, for example) and rendered (on platforms) before ultimately being experienced by individuals. Narrative experience refers to the singular platform-independent and description-independent experience.

Preparing a Narrative Experience

The present invention can be used to create a new narrative experience or transform a conventionally written narrative text by stripping away unnecessary details and redistributing the communication of the experience over text (such as spoken words), lighting effects, audio effects and other available textured and ambient effects. Through selective reduction and redistribution of details, an experience designer can flexibly adapt many existing narratives into narrative experiences prioritizing audience engagement and creativity. The process begins with the narrative text 110. In many cases, the narrative text may be presumed to already contain a desired level of detail (as with well known stories that have been successful in the market). In other cases, the narrative text may be a work in progress. An object of the present invention is to augment the narrative text with sensory effects while avoiding providing excessive detail.

The process shown in FIG. 1 is often iterative. The narrative text is evaluated 110 and words or passages that provide details are selected 120. These details are either removed 130 or redistributed as cues for sensory effects 140. Then the (revised) narrative text may be evaluated 110 again to select additional details 120. Once the desired cues have been created and excessive detail has been reduced, the narrative experience has been created 160. This narrative experience is made up of the revised narrative text and at least two cues representing sensory effects that should be presented in association with the revised text. The narrative experience is typically then described within an experience definition file 170 which can be stored and transmitted or rendered by an experience rendering platform 200.

Evaluation of the narrative text 110 may be performed in many ways, according to designer preferences, skill levels, artistic considerations and other constraints. Generally, evaluation 110 will involve making a determination as to whether the existing narrative text (and cues) provide an appropriate level of detail for the goals of the narrative experience and the audience and whether some effects may better communicate what is currently expressed in the narrative text. Evaluating the narrative text allows an experience designer to strategically (rather than blindly) select details 120 to redistribute 140 or remove 130.

Once details are selected 120, the designer may choose to remove them 130. In some embodiments, unnecessary details may be stripped away from the narrative text by replacing precise nouns and verbs found within a conventionally written narrative with other less precise nouns and verbs that carry the same generic connotations, so that the overall flow and plotline (if applicable) of the original narrative remain. As a simple example, the following passage, "Edwin furiously drove away in his convertible," might be rewritten as "Edwin furiously left" or even "Edwin departed." The less specific passages permit the listener to imagine the character Edwin driving away in any number of vehicles, or even walking away (where walking satisfies the other narrative constraints). The remaining details might be implied by context or left out altogether.

Another way that details can be removed 130 is by employing words that have no meaning at all. In some cases, a designer might decide to replace a known word with an entirely made up term, allowing an existing sentence structure to be used without providing too much detail. In such a way, a "firefighter" might become a "Kra Guru" and a "hose" may become a "keza."

Details may also be redistributed as cues 140. Passages of text that suggest certain descriptive actions may be eliminated from the text and replaced with lighting effects, audio effects or other effects that suggest or imply the performance of the action and/or its effect within the context of the narrative. Take, for example, the following passage:

"I'll be back soon," said Wolrick. "Remember to be patient. Don't open it until it's done. No matter what. Goodbye."

(An audio effect of a popping sound can be heard and a flash/adjustment of lights takes place as well.)

"I wish he'd teach me to disappear like that," muttered Lazlo.

In the above passage, the sound and lighting effects would be combined with the word "goodbye" in the mind of the audience, implying that the character (Wolrick) has left. Explicitly saying that Wolrick has left was not necessary. Further, the lighting effect is non-specific enough to allow different people to imagine very different details. The narrative itself provides the emotional tone and feel—the context for experiencing the event.

In preferred embodiments, a mechanism is provided to associate the effects with an instance or instances within the narrative where the effect would best be expressed. This mechanism may take the form of a set of triggers and responses that would allow cues encountered in the traversal of the narrative to result in the expression of a non-verbal effect supporting the narrative. "Cue phrases" are a convenient mechanism for achieving this, but other mechanism (for example, time based triggers) may be used instead or as well. These cues, triggers, and responses may be described in detail and stored within an experience definition file 170 for distribution and later use. The experience definition file may include (or reference) files or descriptions for sounds, lighting and/or other effects.

Each cue in the file may be associated with an array of events for sounds, lights or other effects. Each event may contain a start time, and other information about the effect. For example, information associated with the sound cues could include start time, action (play, stop, pause), fade in time, fade out time, a looping preference (suggesting if and how the sound repeats), and a designation of output devices (speakers). Examples of information that could be included with light cues could include color data, a start time, fade in time, fade out time, and a looping preference. Other information that might be included would be whether the lighting effect adds to other effects or overrides all other effects. The cue might even contain information on whether it subtracts its values from other effects (which can be used to create shadow effects), or allow for a brief blackout, in which all the lights would be set to black. An example of the information that might appear in an experience file is provided below:

---

Cue Phrase: "Creature Fly"
    Sounds
        Name: DramaticMusic
            action: Play
            file: Music.mp3
            start: 0 seconds
            fade in: 3 seconds
            looping: true
        Name: CreatureEnter
            action: Play
            file: CreatureSound.mp3
            start: 0 seconds
            fade in: 1 second
            fade out time: 1 second
            speakers: left
        Name: BuildingCrash
            file: BuildingCrash.mp3
            start: 2 seconds
            fade in: 0 seconds
            speakers: all
    Lights
        Effect: CreatureFlyingOver.csv
            Start Time: 0
            Fade in time: 1 seconds
            Looping: false
Cue Phrase: "was gone"
    Sounds
        ...
        Name: DramaticMusic,
            Action: Stop
            fade out time: 3 seconds
    Lights
        ...

---

As can be seen, a first is intended to start a number of lighting and sound effects including music when the phrase "creature fly" is encountered. Some of the effects play once and then go away, while other effects continue until stopped. The second cue, with the associated cue phrase "was gone" is intended to stop the looping dramatic music, which began upon encountering the first cue phrase.

It should be understood that the present invention may utilize a variety of effects including visual (for example, ambient, spot and textured) and audio (for example, sound, music and low frequency effects). Additionally, novel effects (such as scent, temperature and haptics) may be incorporated if desired or supported by the experience rendering platform. Each effect can be parameterized in a way appropriate to the effect. For this reason, certain extensible data file formats (XML and JSON, for example) may be preferred. Both XML and JSON formats have the advantage of being readable by humans and machines alike. Many other expressive data formats may also be suitable.

While other details may be added at the discretion of the designer, the method described herein enables a multisensory experience to be constructed that avoids unnecessary duplication of narrative details. The new narrative experience is therefore arguably less likely to lead to passive consumption as the audience is not overwhelmed with details that have been added to an already "complete" narrative work.

Preparing a Narrative Experience: Story Creator

While the process described herein for generating narrative experiences does not require the use of any special tools, a software implemented process can enable a designer to create and modify narrative experiences more efficiently. Embodiments of such are described below.

A story creator is a hardware and/or software system that enables the narrative experience preparation process. A story creator consistent with the present invention need not include any specific hardware or software components but one skilled in the art would understand that many typical components could used beneficially to enable the unique narrative experience preparation process.

Figure 2:
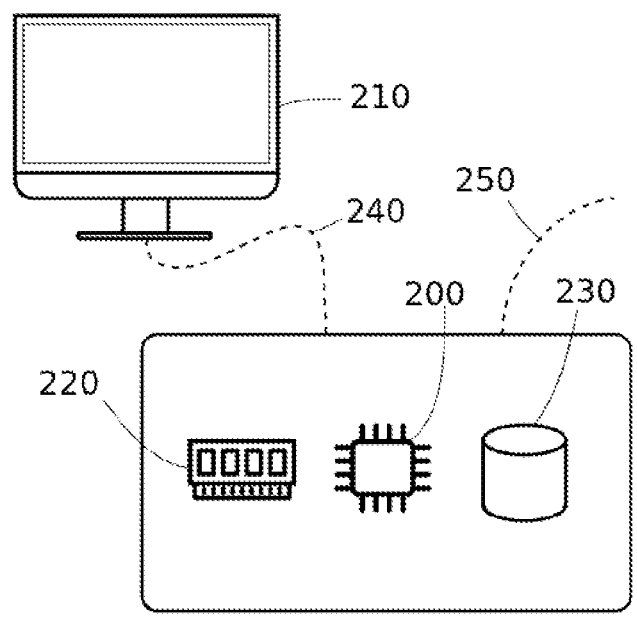
FIG. 2 shows an example of a system running story creator software.

One depiction of a typical system capable of running a story creator is depicted in FIG. 2. A user interface 210 is connected to a processing system containing a CPU 200, a storage media (such as a hard drive) 230 and memory for holding running applications 220. The connection 240 between the display and the other portions of the computer system may can be over a short distance (as between components contained by a single chassis) or may be over a long distance (as in web applications communicating with a virtual server over a wireless network). A cloud based (or other network attached) computing system may be used to perform some or all of the steps required by the story creator. While a text-based interface could effectively support the process, some of the more desirable embodiments will implement a graphical user interface (GUI) with widgets representing the narrative, sensory channels, cues and effects. Preferentially, the story creator would be paired with an experience rendering platform, enabling the designer to verify the narrative experience has been defined as intended. A network connection 250 may be used to provide the necessary communication. There may be additional benefits to configuring some functions of the story creator to run directly on the experience rendering platform. In particular, providing the story creator as a web-style application served by experience rendering platform can reduce the requirement for additional hardware and guarantee at least a minimal ability by the rendering platform to render at least some of the sensory effect channels exposed by the story creator interface.

In operation, some embodiments of story creator will provide a view to the narrative text, some sort of timeline corresponding to the narrative and several controls on the display 210. Ideally, the text would be editable directly from the application interface. Through the interface, the designer would be able to remove details from the narrative text and select cue words, defining effects that should be played. These cues should appear on the display so that they can be reviewed and edited as required. In some embodiments, the addition of cues may be represented as markup to the narrative text. Spans of time may also be marked up to indicate ongoing effects such as looping audio tracks. A library of existing effects and cues can be exposed through drop-down menus or other user interface widgets to enable the designer to quickly assemble the desired combination of effects to use.

In some embodiments, the story creator takes the form of a web server hosted on a computer system. The computing system could be a simple compact device, such as a Raspberry Pi. In this simple example, the web server provides an interface to create a story, upload sound and lighting files for the story, and create the experience definition to play on the experience rendering platform. Designers view the hosted in their own browser to view and interact with stories.

For other embodiments, the story creator may include a more active interface for receiving text corresponding to the narrative. The story creator may use text analytics to identify passages within the text that may either be eliminated, removed to be expressed as an effect, augmented with an effect or replaced with non-specific or less descriptive text. The suggestions may be represented as text markup on the display 210. In this way, the story creator would serve as an active assistant in the transformation (or creation) of the narrative, providing suggestions of things the designer may do to make the narrative more engaging consistent with the teachings of this invention. In order to make, for example, suggestions of less descriptive text, the story creator may query a data structure relating words of varying levels of specificity. A passage from the narrative text specifically referencing a "dumbo octopus" might prompt a suggestion by the story creator to replace "dumbo octopus" with "sea creature" or something even more generic/nondescript. Using existing machine learning techniques, portions of the narrative can be defined and classified, providing some context for how passages might be treated. A sudden event referenced within a particularly tense portion of the narrative portion of text, might be highlighted as a good place to consider placing a cued effect. The story creator might suggest sounds, music, colors or other effects in a manner similar to by the Narratarium, but within the context of preparing a narrative experience in advance (so the real-time constraints are relaxed). Ideally, parameters can be set to suggest the level of assistance that the story creator would provide—or how aggressive the assistant is with making suggestions.

There are advantages to equipping the story creator with the ability to both load and store experience definition files. First, as already discussed, storing a file in a suitable format can enable easy transfer of the experience definition from the story creator to any number of experience rendering platforms. Beyond this, the ability to load an existing experience definition file enables the story creator to be used to customize experiences created by other designers or iteratively edit experience works in progress. In some embodiments, the story creator may additionally provide some functionality to compress the experience definition file enabling efficient storage and/or network transmission.

Rendering the Narrative Experience

To this point, the discussion has focused on designing improved narrative experiences. This is, of course, only a part of the solution. Every experience will need to be rendered on a platform to be appreciated and the platforms may vary as much as the experiences themselves.

In general, an experience rendering platform consistent with the present invention will have hardware to enable two or more sensory channels and an effect controller 400 to manage the effects on each channel as the narrative progresses. Typical implementations will provide at least one sensory channel for audible effects and at least one sensory channel for visual effects.

Figure 3:
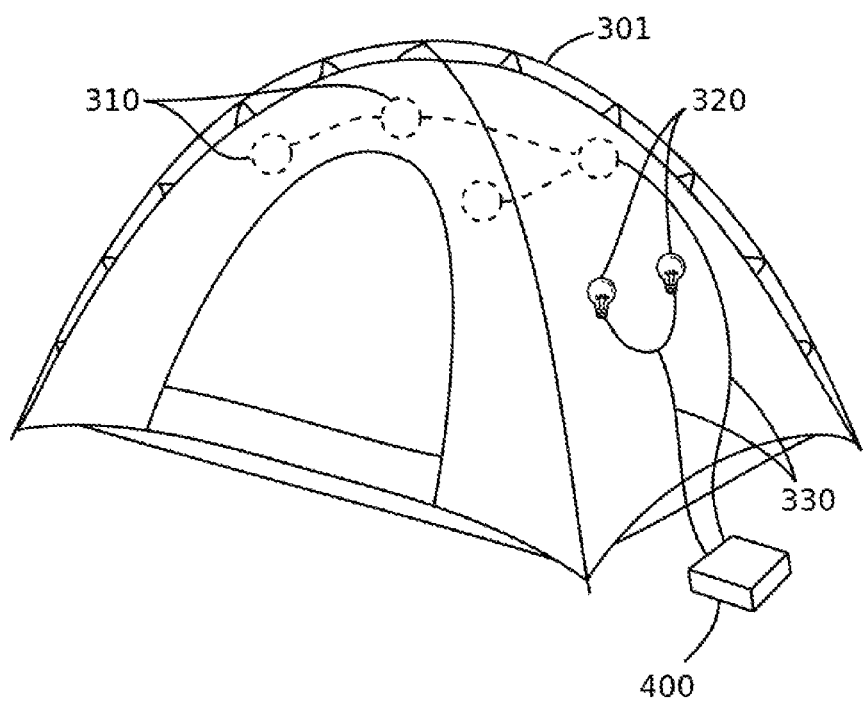
FIG. 3 shows an example of an experience rendering platform.

One especially good application for the present invention involves reading stories to children. For embodiments designed to appeal to children, it may be advantageous to build around a tent platform 301, as shown in FIG. 3, because many children enjoy playing in tents and building "forts" out of blankets and similar items. A tent with the ability to immerse a child within a story combines a favorite playspace with an enhanced form of storytelling and would be especially valuable. A child (or group of children) might even help assemble the tent, adding another level of engagement. A tent also has the advantage of being relatively portable and can be set up in a variety of places.

In environments where larger groups of children are involved in storytime, such as in libraries or preschools, a different embodiment might be more suitable. In these settings, some of the advantages of using a tent could be recreated by using various arrangements of "curtains" containing the necessary hardware. Such an embodiment also has the advantage of being portable, and could also be used in embodiments intended to appeal to adults.

Figure 4:
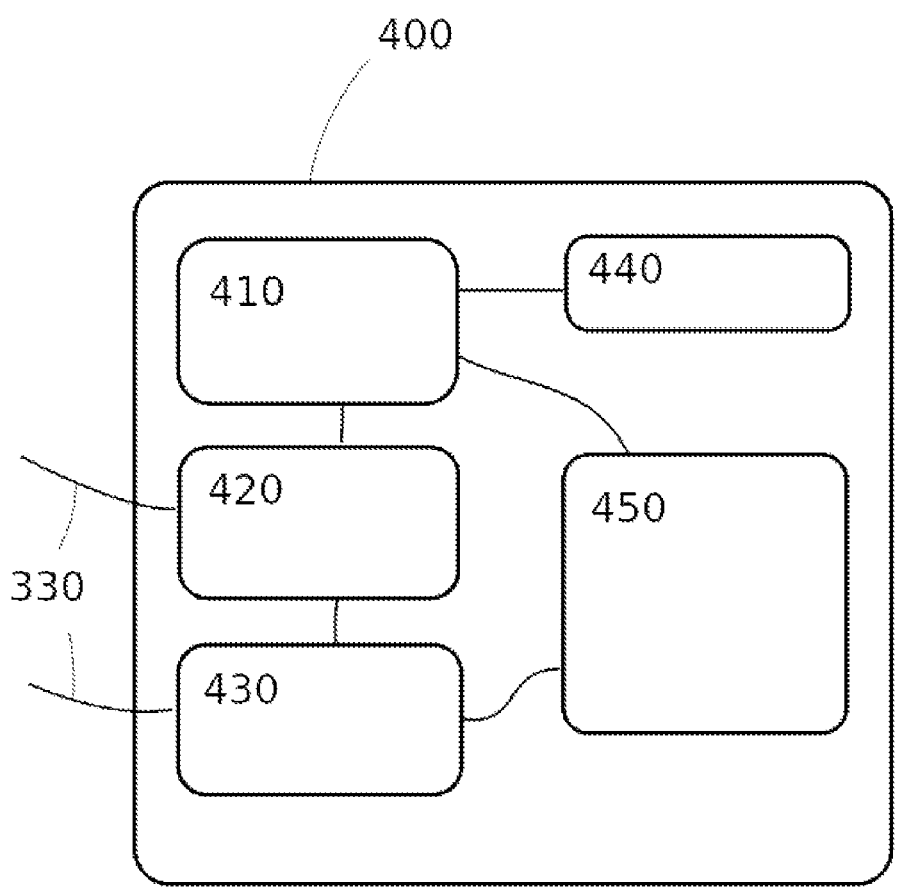
FIG. 4 shows components of an example effect controller.

In a preferred embodiment, the experience rendering platform encloses an audience of children within a tent 301, which provides a base structure. Lighting 320, speakers 310 and associated wiring equipment may be sewn into the tent cover or may be removably attached using using Velcro-style or other adhesive straps, hooks or clips. In FIG. 3, two lights 320 are depicted on the outside of the tent 301 providing a more diffuse effect. It is understood that these or other lights could be placed in a variety of places and orientations as desired, and may be controlled independently. The wiring 330 connects the lighting 320 and speakers 310 to the effect controller 400, which tells the lighting and speakers what to play and when. FIG. 4 shows an example of an effect controller. In this example, the controller assembly includes a compact computer system 410, such as a Raspberry Pi, an amplifier 430, an interface to the lights and speakers 420, a communication interface 440 to receive instructions from the story controller and a power supply 450. In this example, the communication interface 440 is a wireless interface with a data connection to the story controller 500. The computer system 410 has data files representing sounds and lighting effects in memory. When the story controller 500 sends a message to the effect controller 400 in response to an action word being read, the computer system 410 sends a signal through the interface to the lights and speakers 420 at the appropriate time to render the requested audio and/or visual effects. An amplifier 430 increase the power of the signal that is sent to speakers. All of the components are powered by a power supply 450, which may be a battery, wall adapter.

In a preferred embodiment such as the one shown in FIG. 3, the experience rendering platform contains four individually controllable speakers 310 arranged in such a way as to provide a "surround sound" experience for the users. Using individually controllable speakers enables the effect controller to create the impression that a sound is moving by directing specific audio content to specific speakers and altering the volume as necessary. In this same way, it is also possible to simulate a greater number of speakers by rendering sounds directed to a space between two speakers on both of the speakers. In a further preferred embodiment, the speakers are connected to the effect controller 400 using connectors that make it easy for the user to connect and disconnect the speakers 310 from the effect controller as necessary. Many embodiments will also provide a subwoofer for rendering low frequency effects.

In a preferred embodiment, individually addressable LED strip lights are provided to render lighting effects. The power for the LED light strips may also be connected to the effect controller. Alternatively, a dynamic ambient lighting system such as that provided by Philips Hue Play and Signe lamps may be connected to the effect controller through an appropriate application programming interface (API) and used to render lighting effects. There are few limitations on the types of lighting that may be incorporated into the experience rendering platform. An important factor for use, however, is that the platform receives a cue that it can interpret meaningfully into something that light will do. A good platform implementation will provide basic coverage for some of the audio and visual effects most frequently employed in narrative experiences.

Figure 5:
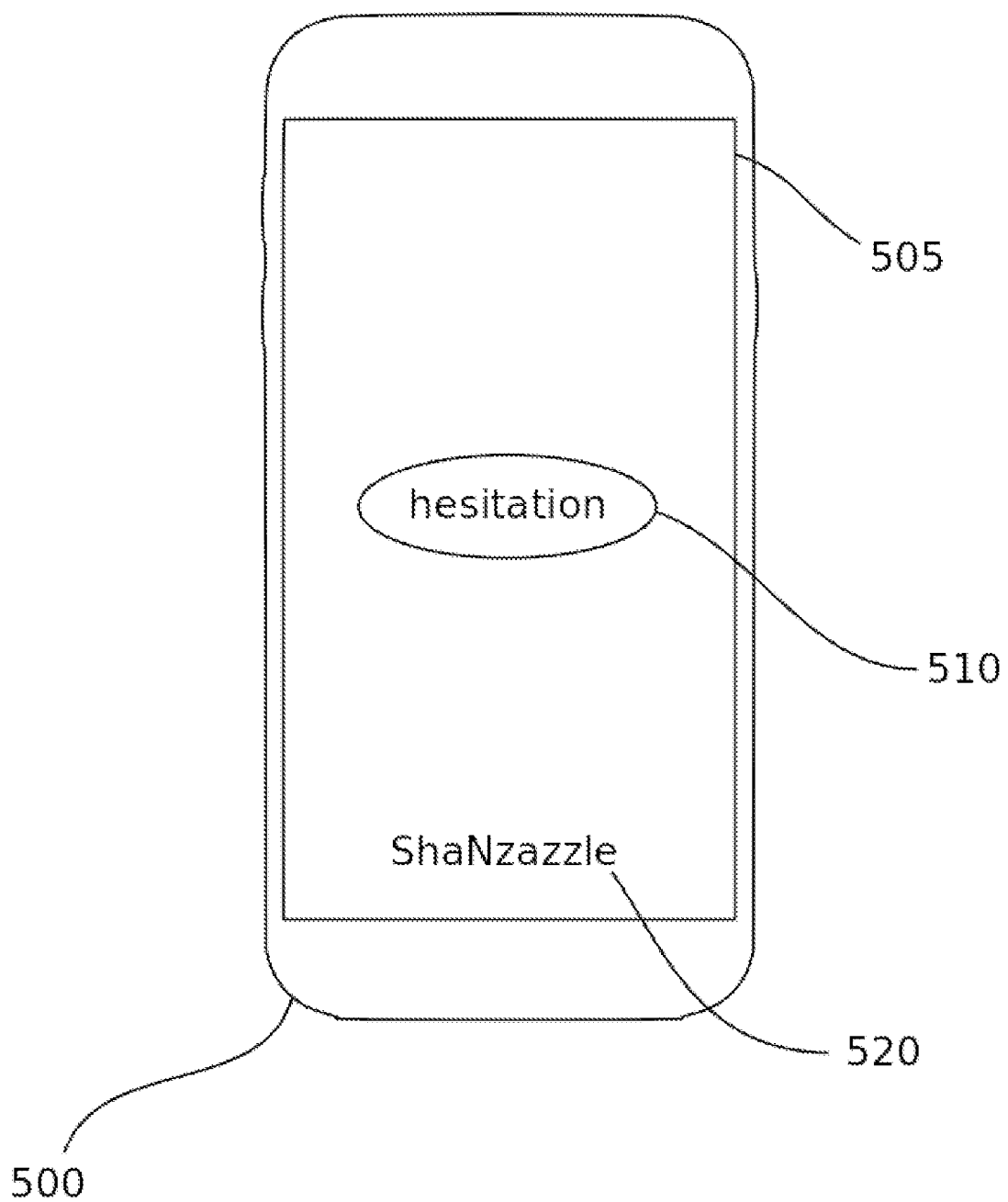
FIG. 5 shows a preferred embodiment of the action words as they would appear on the story controller.

The story controller 500 enables a reader to interact with the experience rendering platform by telling the platform what effects to render and when. The story controller can be implemented on many platforms and may even be integrated into other parts of the experience rendering platform. In a preferred embodiment, the story controller 500 is implemented on a mobile device such as a mobile phone or tablet and uses a wireless connection (such as Bluetooth or WiFi) to communicate with the the rest of experience rendering platform. The display 505 of the mobile device can be used to provide an interface for navigating a collection of narratives/stories and selecting a narrative experience to be rendered. Preferably, the story controller would direct the download of stories into a library and the user can selectively load the stories into one or more other components of experience rendering platform. Once a story is selected from the story controller and loaded into the experience rendering platform, a user can interact with the story controller during the reading of the selected story. While the story is being read, the story controller may display highlighted "action words" (or "cue words"). The action word 510 could be a word (or phrase) from the text itself and the reader (or a listener) could tap the word on the story controller interface when the word is read. An additional, upcoming, cue word 520 may also be shown to provide context. FIG. 5 shows a preferred embodiment of the action words 510 as they appear on the story controller 500. The story controller 500 may also display some keyed information to confirm that the displayed button corresponds to with the current portion of the narrative. One way of doing this would be to display the same color that is being rendered on a wall of the experience rendering platform. Another way to provide context might be to include additional narrative text on the display 505 (however less prominently) so that each cue word appears in context. Tapping on an action word will allow the experience rendering platform to launch the appropriate audiovisual effects for that word. A confirmation graphic may briefly appear on the story controller display 505 and the control may be disabled for a moment to prevent unintentional repeated taps.

In an alternate embodiment, the story controller 500 may itself be able to recognize the reader's speech to determine to correct position in the story. Several software libraries are currently available to achieve this and basic speech recognition functions are built into many modern mobile phone platforms. Recognizing where someone is speaking in known text is typically considered easier to do than determine what is being spoken when no script is available. Further, advances in modeling and recognizing speech make it possible for even very simple devices to recognize speech in real-time. This makes it easier to enable a story controller that can automatically send a signal to trigger one or more sensory effects when a specific point within the narrative text has been reached. Alternatively, the speech recognition could be used to simply alert a human operator of the story controller that the cue phrase has been uttered—providing the user-interface elements but still allowing the operator to determine exactly when the effects are triggered.

Although embodiments of techniques and objects have been described in language specific to features and/or methods, it is to be understood that the subject of the appended claims is not necessarily limited to the specific features or methods described. Rather, the specific features and methods are disclosed as example implementations of the present invention.

What is claimed is:

1. A method to prepare narrative content for presentation as a multi-sensory experience, the method comprising:
    identify a plurality of text selections from said narrative content;
    for each of said text selections, perform at least one of the following:
        replace said text selection with replacement text wherein said replacement text is less descriptive than said text selection;
        remove said text selection and create a sensory cue wherein said sensory cue suggests the content of said text selection within the context of said narrative content; and
    creating a new description of said narrative content, the new description comprising:
        revised text corresponding to said narrative content;
        a plurality of cues corresponding to positions within said revised text, each cue being operable to describe a sensory effect that should occur during the presentation of said narrative content.

2. The method of claim 1, further comprising: storing said new description of said narrative content on computer readable media.

3. The method of claim 1, further comprising: transmitting said new description of said narrative content over a computer network.

4. The method of claim 1, further comprising: loading said narrative content from computer readable media.

5. The method of claim 1, further comprising: retrieving said narrative content over a computer network.

6. A computer system for preparing narrative content for presentation, the system comprising:
    a processor;
    computer readable storage medium;
    a story creator application operable on said processor to store onto said computer readable storage medium a plurality of cues corresponding to positions within a revised text, each cue being operable to describe a sensory effect that should occur during the presentation of narrative content; wherein at least two cues from said plurality of cues have been created by removing text selections from said narrative content.

7. The computer system of claim 6, wherein said story creator application is further operable to identify text selections within said narrative content as candidates for removal or replacement with less specific text or sensory effects.

8. The computer system of claim 7, wherein said story creator application analyzes the text to identify the text selections for removal or replacement.

9. The computer system of claim 7, wherein said story creator application is bundled with a plurality of template audio and visual effects.

10. The computer system of claim 7, wherein said story creator application is configured for deployment over a network in a client-server arrangement.

11. The computer system of claim 7, wherein said story creator application provides markup for narrative details.

12. The computer system of claim 7, wherein said story creator application provides an interface to edit sensory effects.

13. The computer system of claim 6, wherein said processor is shared with an experience rendering platform.

* * * * *